April 9, 1968 — A. STATHOPLOS — 3,377,207
SPACE HEAT REACTOR
Filed Oct. 19, 1965 — 5 Sheets-Sheet 1

INVENTOR
Anthony Stathoplos
BY
Pennie, Edmonds, Morton, Taylor & Adams
ATTORNEYS April 9, 1968 A. STATHOPLOS 3,377,207
SPACE HEAT REACTOR
Filed Oct. 19, 1965 5 Sheets-Sheet 2

INVENTOR
Anthony Stathoplos
BY
ATTORNEYS

INVENTOR
Anthony Stathoplos
BY
ATTORNEYS

April 9, 1968 A. STATHOPLOS 3,377,207
SPACE HEAT REACTOR
Filed Oct. 19, 1965 5 Sheets-Sheet 4

INVENTOR
Anthony Stathoplos

April 9, 1968

A. STATHOPLOS 3,377,207

SPACE HEAT REACTOR

Filed Oct. 19, 1965

INVENTOR
Anthony Stathoplos
BY
Pennie, Edmonds, Morton, Taylor & Adair
ATTORNEYS 3,377,207
        SPACE HEAT REACTOR
Anthony Stathoplos, Briarcliff Manor, N.Y., assignor to
 United Nuclear Corporation, White Plains, N.Y., a corporation of Delaware
      Filed Oct. 19, 1965, Ser. No. 497,805
            4 Claims. (Cl. 136—202)

ABSTRACT OF THE DISCLOSURE

A water-cooled and moderated non-boiling low pressure nuclear reactor is used for space heating purpose and for providing electrical power. The reactor is self regulating at equilibrium power level without internal moving mechanical elements such as conventional control rods. Within the pressure vessel of the reactor a shroud is used to divide the inside of the vessel into an inner and an outer zone for housing the reactor core and heat exchanger respectively. The water coolant is circulated among the inner and outer zones by natural convection. A depleted uranium blanket surrounding the periphery of the pressure vessel is provided to capture neutrons escaped from the reactor core. The blanket is used as hot junctions and the outside of the pressure vessel as cold junctions for thermal electrical elements to generate electricity.

---

This invention relates to a small heterogeneous nuclear reactor suitable for installing in an underground pit to generate low temperature heat for process or space heating purposes at cost competitive to conventional fuels. More particularly, it relates to a non-boiling water cooled and moderated nuclear reactor operating at low pressure and capable of self-regulation at its equilibrium power level without internal moving mechanical elements as a conventional control rod. The reactor also can provide electrical power using the neutron leakage inherently associated with a small reactor.

The present trend for economic utilization of nuclear power is to increase the reactor size which is due primarily to savings that can be realized in plant investment and operating costs in terms of cost per unit of nuclear energy recovered from the larger size reactor. The savings come about because certain items are independent of or do not grow in proportion to the reactor size. Such items include reactor instrumentation and control, reactor containment, shielding, and labor costs for operation and maintenance. For the smaller nuclear reactor, the higher cost per unit energy has placed it in an unfavorable economic position to compete with conventional fuels in applications such as space heating and power generation despite their many outstanding characteristics and advantages. Attempts to improve its economic position by eliminating or simplifying certain reactor components to reduce capital investment and operating costs have not been successful for the principal reason that the removal of simplification of certain reactor components necessitates sacrificing certain reactor operational characteristics, particularly its safety.

I have now found that a small reactor can be constructed with a specific configuration that overcomes the many disadvantages inherently associated with a conventional small nuclear reactor. Broadly stated, the reactor of this invention comprises a pressure vessel adapted for underground installation, a critical reactor core assembly geometrically mounted in the vessel, a shroud surrounding the core assembly to provide an inner zone and an outer zone within the vessel, and a body of water substantially filling the zones and being circulated among them by natural convection from thermal energy generated in the reactor during its operation. There are means located at the outer zone of the reactor for removing sufficient heat generated by the reactor during its operation to maintain the equilibrium power level of the reactor. A safety rod is used for the reactor which is located fully in the reactor core assembly and fully out of it during the operation of the reactor.

The high neutron leakage associated with the small reactor can be advantageously utilized to improve greatly the neutron economics of the reactor system by placing a fissionable blanket around the periphery of the pressure vessel to capture the escape neutrons for power generation. The thermal energy generated in the blanket can be recovered by conventional means. It is preferred to use thermal electrical elements disposed between the blanket and the pressure vessel. The thermal electrical elements use the blanket as hot junctions and the connections to the pressure vessel as cold junctions for the generation of electrical power.

The nuclear reactor of this invention is designed to operate at low pressure without mechanical moving elements within the reactor to provide low temperature nuclear heat for process and for space heating purposes. The reactor substantially eliminates or simplifies many costly reactor components such as nuclear instrumentation, control rods, control panels, hydrogen and oxygen recombiners, purification systems, piping systems such as pumps and valves and separate pressurizers. The simplification and the elimination of these components do not compromise or sacrifice the reactor safely and its operational characteristics.

Further to illustrate this invention, specific embodiments of this invention are described hereinbelow with reference to the accompanying drawings wherein.

Figures 1, 2:
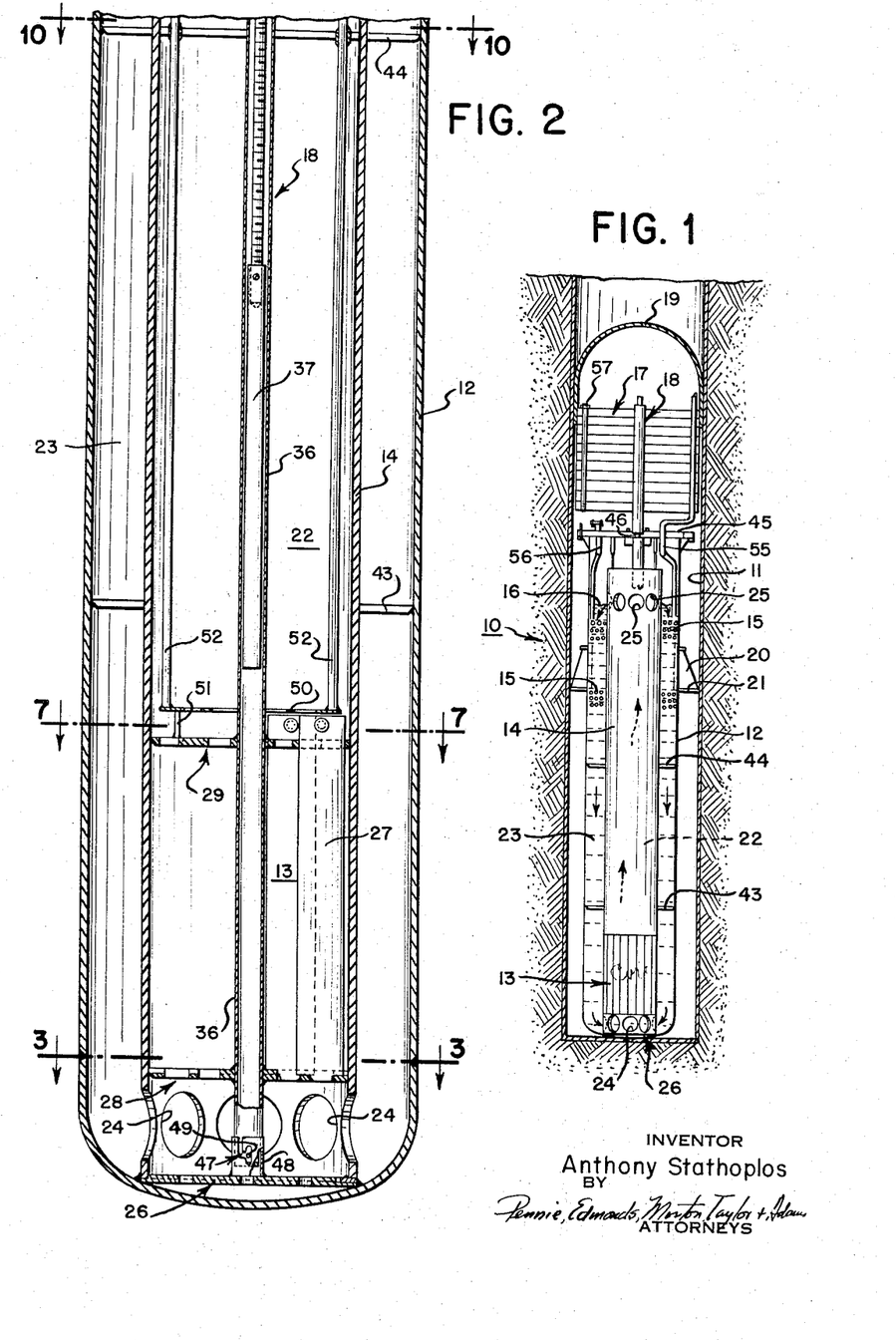
FIG. 1 is a side elevation of the nuclear reactor of the invention installed in an underground pit.
FIG. 2 is a partial side elevation of the lower portion of the pressure vessel and showing the reactor core portion.

Referring initially to FIG. 1, the nuclear reactor assembly 10 is installed in an underground iron pipe well 11. The reactor assembly 10 comprises a pressure vessel 12, a reactor core 13 concentrically positioned in the lower portion of the pressure vessel, and a cylindrical shroud 14 surrounding the core and extending above it to substantially the top portion of the pressure vessel. An intermediate heat exchanger 15 is disposed below the top of the shroud in the annular space between the shroud and the wall of the pressure vessel. The pressure vessel is filled with water to a level as indicated by water line 16. This body of water serves as the coolant as well as a moderator for the reactor core. The radiation is minimized to a low level by steel shield plug 17 placed above the pressure vessel. The start-up and shut-down of the reactor is accomplished by a control rod assembly 18 passing through the shield plug 17 and extended to the reactor core 13. The entire reactor assembly 10 is sealed in by a semispherical cap 19.

This reactor which is designed to provide 100 kw. thermal power continuously for three years in the form of hot water at 180° F. is particularly advantageous for remote terrestrial applications. The iron pipe well 11 used for this reactor assembly is about 14½ ft. deep and about 13 in. in diameter. The pressure vessel which measures 10 ft. in height and 20 in. in diameter is vertically suspended in the well and is supported by flange 20 which rests on an annular ring 21 welded to the cast iron pipe. Concentrically positioned in the lower portion of the pressure vessel and being about 6 in. above its bottom is the cylindrical reactor core assembly 13 which has an over-all dimension of 18 in. by 12 in. in diameter. The reactor core 13 comprises a plurality of vertical fuel plates. Its construction and characteristics will be described subsequently in greater detail with reference to other accompanying drawings.

The shroud 14 which surrounds the reactor core assembly and extending above it, forms a chimney in the center of the pressure vessel dividing the inside of the pressure vessel into an inner cylindrical zone 22 and an outer annular zone 23. The openings 24 and 25 at its bottom and the top, respectively, serve as inlets and outlets for the coolant allowing it to circulate in the reactor assembly by natural convection caused by the thermal energy generated in the reactor core 13 during its operation. The coolant after absorbing the heat generated in the reactor core 13 moves upwardly as indicated by the dotted line arrow. It overflows through the openings 25 into the outer zone 23 and passes downwardly into the intermediate heat exchangers 15. The coolant after passing through the heat exchangers is recycled and reenters into the reactor core 13 by way of openings 24 as shown by the solid line arrows. The shroud is 12 in. in diameter and about 9 ft. in height extending from the bottom of the pressure vessel to above the intermediate heat exchanger. Its bottom is secured to a cylindrical plate 26 as more clearly shown in FIG. 2.

Now referring in FIG. 2, the reactor core assembly 13 consists of a total of 69 fuel plates 27. These fuel plates are held vertically by aluminum grip plates 28 and 29 at the bottom and the top of the core, respectively. Each of the fuel plates is 20 in. long, 2.88 in. wide, and 0.060 in. thick. The fuel plate is clad with aluminum with a thickness of 0.020 in. There is approximately 50 ft.² of fuel plate heat transfer surface available which at 100 kw. results in an average heat flux of 6800 B.t.u./hr.-ft.². The plates have been arranged in two annular rings with 23 plates in the inner ring and 46 plates in the outer ring. The detailed arrangement of the fuel plates is more clearly shown in FIGS. 3 to 9.

Figure 3:
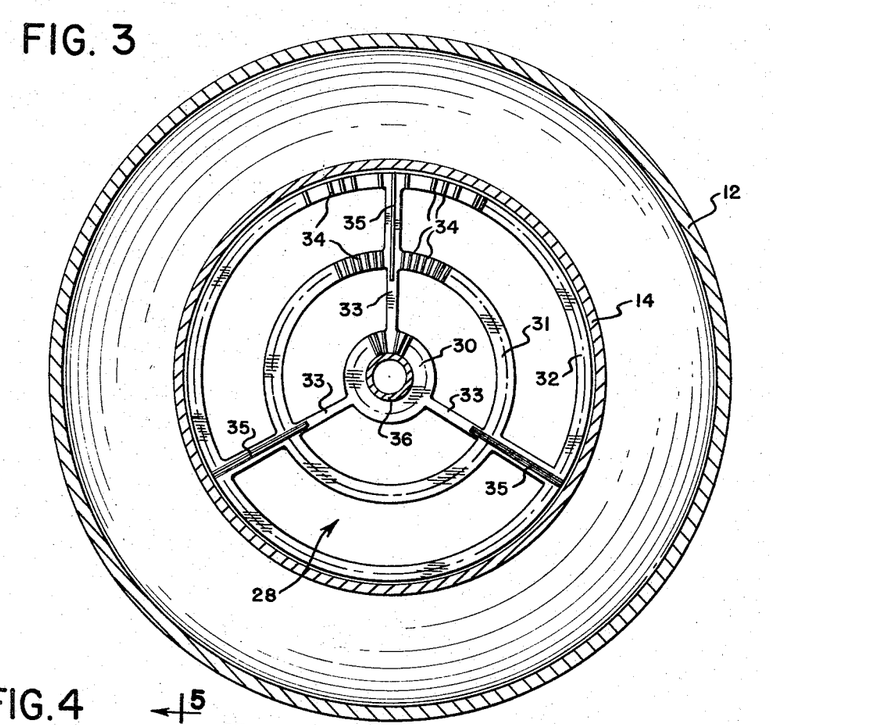
FIG. 3 is a cross-sectional view of the core portion of the reactor taken along line 3—3 of FIG. 2.
Figure 4:
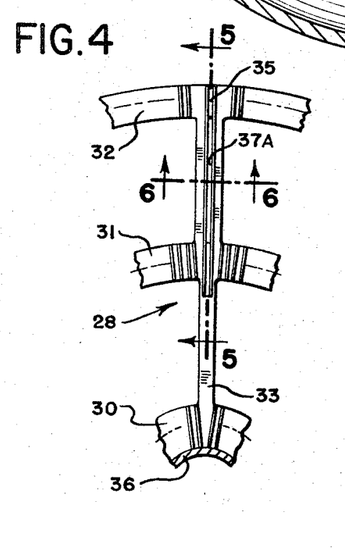
FIG. 4 is an enlarged fragmentary section showing the lower supporting structure for the fuel elements.
Figures 5, 6:
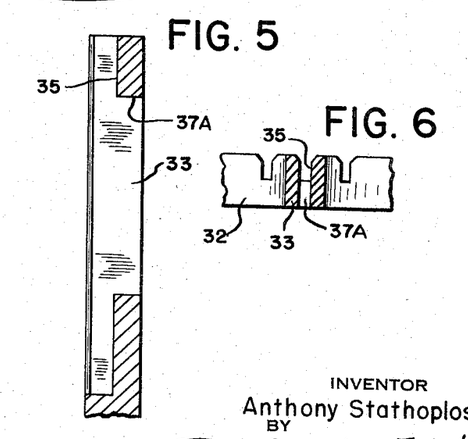
FIG. 5 is a section taken along line 5—5 of FIG. 4.
FIG. 6 is a fragmentary cross-sectional view taken from line 6—6 of FIG. 4.

The bottom aluminum grip plate 28, as shown in FIG. 3, consists of three concentrically arranged supporting rings 30, 31, and 32 interconnected by three radially extended ribs 33 to form an integral support structure for the fuel plates. The innermost supporting rings 30 are mounted on an aluminum thimble 36 which is used to house the control rod 37 (see FIG. 2) to form the control rod assembly 18. The rings 30, 31, and 32 are provided with properly aligned grooves 34 for receiving the fuel plates in the form of two annular rings. The fuel plates fit in the grooves of the supporting rings in a tongue and groove type of joint. The grooves 35 on the radially extended ribs 33 have the length equivalent to the width of the fuel plates, as shown in FIG. 4, and have openings 37A for allowing the coolant to pass therethrough (see FIGS. 5 and 6).

Figure 7:
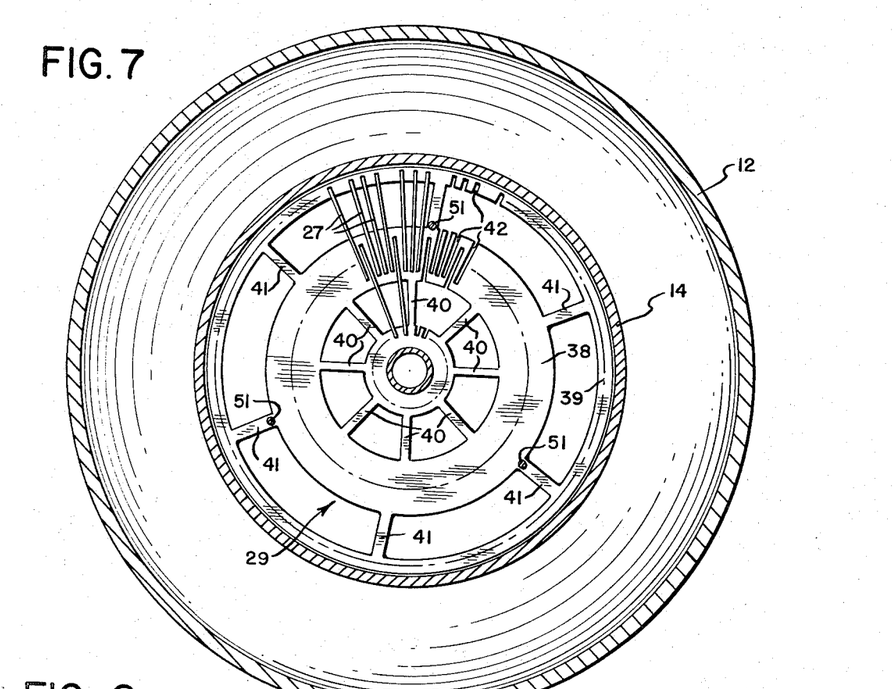
FIG. 7 is a cross-sectional view showing the upper portion of the reactor core assembly taken along line 7—7 of FIG. 2.
Figure 8:
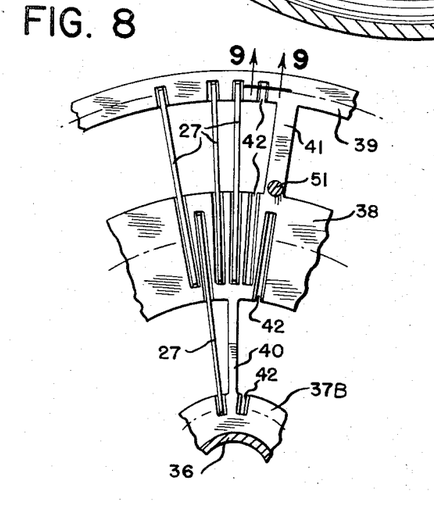
FIG. 8 is an enlarged detailed fragmentary section of the upper supporting structure for the fuel elements.
Figure 9:
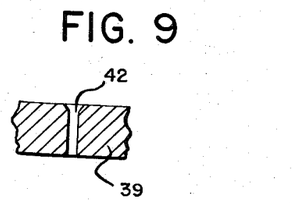
FIG. 9 is a small broken section showing the fuel plate connection taken along line 9—9 of FIG. 8.

The top aluminum grip plate 29, as shown in FIG. 7, also consists of three rings 37B, 38, and 39. The eight radially extended ribs 40 interconnect the innermost ring 37 to the wider middle ring 38 and six radially extended ribs 41 interconnect the middle ring 38 corresponding to the grooves 34 of bottom aluminum grip plate 28 to a narrower outer ring 39. The innermost ring 37B is also mounted on the aluminum thimble 36. The rings have properly aligned slots 42 to allow the fuel plates 27 to pass therethrough and vertically to position the fuel plates 27 in the reactor core. The positioning of the fuel plates 27 and the cross section of the slots 42 are shown in FIGS. 8 and 9 in greater detail. Arranging the fuel plates in two annular rings and positioning them vertically in the manner described provides a higher fuel density in the center of the core and takes advantage of the minimum critical mass loading.

Referring back to FIG. 2, the reactor core 13 is surrounded by a ⅛ inch thick corrugated aluminum shroud 14 (corrugation of the shroud is not shown in the drawings) which forms a chimney in the center of the pressure vessel 12 to promote natural convecting flow of the coolant. The corrugated shroud 14 serves effectively as an insulation for the hot water rising up the center of the pressure vessel 22 and the cold water flowing downwardly in the outer annular space 23. The shroud 14 is welded or otherwise secured onto the circular disc 26 at the bottom of the pressure vessel 12 and is held vertical by two sets of spacing ribs 43 and 44. Each set of spacing ribs consists of three bars spaced 120° apart and welded to the periphery of the shroud 14. The arrangement of the spacing bars is more clearly illustrated in FIG. 10.

As mentioned previously, the reactor core 13 is controlled by the control rod 37 housed in the aluminum thimble 36 which penetrates from the top of the pressure vessel through the center of the reactor core. The absorber portion of the control rod 37 is an aluminum clad cylinder of cadmium approximately 1 in. in diameter and 18 in. long. The control rod travels about 20 inches which is accomplished by a manually operated rack and pinion or other screw type device. The total reactivity worth of the rod is estimated to be 2.0%. The rod is designed to be normally either in the fully in or fully out position. The latter position is shown in FIG. 2. The full-in position is used to bring the reactor to subcritical in cold clean condition. Normally, the reactor always operates with the rod fully out.

Figure 11:
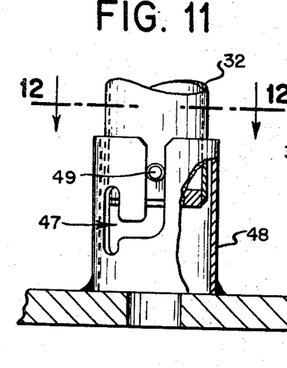
FIG. 11 is a side elevation showing the safety rod assembly connected to the supporting plates at the bottom of the pressure vessel.
Figure 12:
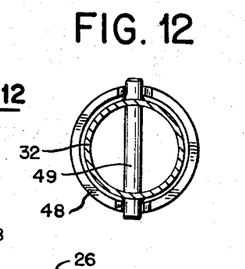
FIG. 12 is a cross section taken from the line 12—12 of FIG. 11.

Both the rod and the thimble are disconnected at the pressure top head 45 (see FIG. 1) at connections 46 so that the head may be lifted without removing the control rod assembly 18 and to allow refueling without disturbing it. The thimble 36 is secured to the circular disc 26 at the bottom of the pressure vessel 12 by a bayonet type of locking device 47 which is illustrated in FIGS. 11 and 12. The locking device 47 consists of a female socket 48 having two J-shape channels for receiving the end portion of the thimble 32 which has a circular bar 49 protruding out diametrically from the end portion of the thimble to engage the J-shape channels for locking the thimble to the disc 26.

Figure 10:
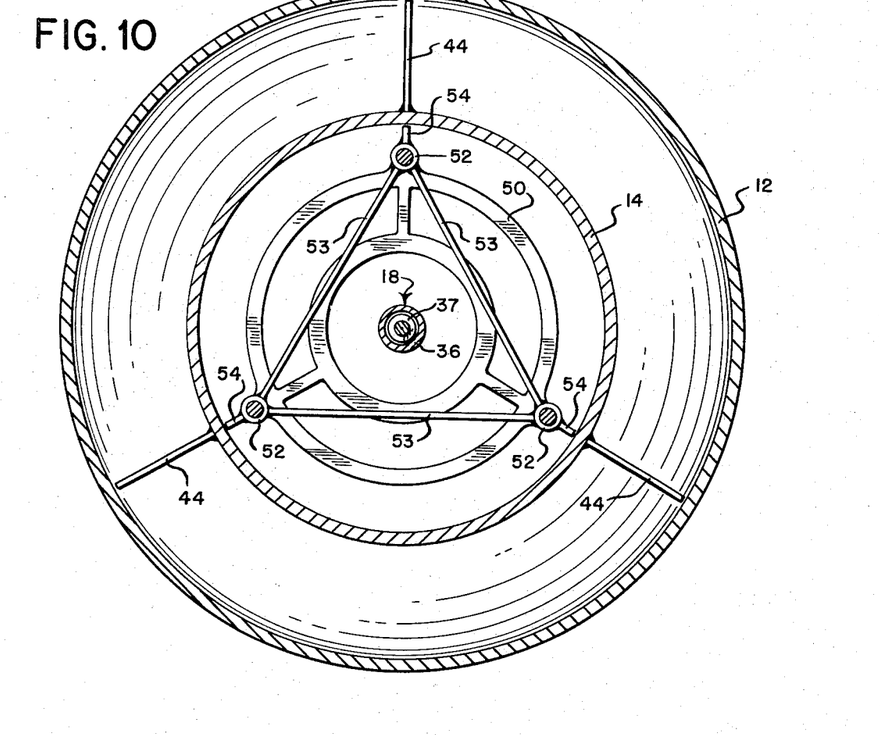
FIG. 10 is a cross-sectional view of the upper portion of the reactor taken along line 10—10 of FIG. 2.

The top aluminum grip plate 29 is connected to a perforated supporting plate 50 by three equally spaced suspension rods 51. The plate 50 is in turn suspended in the pressure vessel by three rods 52 mounted on the pressure head 45 (see FIG. 1). These three rods 52 are joined by connecting rods 53 to form an isosceles triangle as shown in FIG. 10. Three small spacing rods 54 are used to maintain the supporting rods in their proper position.

As stated above, the intermediate heat exchanger is located near the top of the pressure vessel in the annular space between the shroud 14 and the wall of the pressure vessel 12. The exchanger 15 consists of four helical coils of ¾ in. aluminum tubing. The external (secondary) water coolant flows in parallel through the four coils extracting heat from the primary water coolant flowing transversely to the tubing on the outside. A total of about 150 ft. of tubing is required to provide a heat transfer surface area of 34 ft.$^2$. A single inlet line 55 and an outlet line 56, each one ⅝ in. O.D., are provided for the secondary coolant (see FIG. 1). Headers for the inlet and outlet lines 55, 56, respectively, are provided integrally with the top head of the pressure vessel allowing the entire heat exchanger to be removed as a unit with the pressure vessel head. The heat exchange tube is closely spaced (¹/₁₀ in. minimum clearance) to provide throttling of the primary water coolant to provide heat transfer.

The pressure vessel 12 has a thickness of ½ in. and is sufficient to withstand a 150 p.s.i.g. internal pressure at 300° F. The top head 45 is 20 inches in diameter and is flange connected to the vessel body. The top head is designed so that the inlet and outlet water lines 55 and 56, respectively, and the control rod assembly 18 are disconnectable to allow removal of the top head for access to the reactor core.

The shield plug 17 is 2 ft. thick, 30 in. in diameter, consisting of a plurality of steel plates which serve primarily as a gamma ray shield above the pressure vessel. The shield plug is supported by a circular steel strip (not shown) welded to the cast iron pipe well and held together by bolts 57. The total weight of the plug is about 4800 pounds. The plug is pierced to allow the inlet and outlet lines of the external water systems and the control rod assembly 18 to pass therethrough.

During normal operation, the entrance temperature to the reactor core is 180° F. and the exit temperature is 200° F. At 100 kw. thermal operation, the water flow rate is 17,000 pounds per hour, approximately 34 gallons per minute. Water velocity through the core is 0.11 foot per second. Throttling of the water in the intermediate heat exchanger results in maximum flow velocities of 0.5 foot per second. Normal system pressure is 10 p.s.i.g. which is sufficient to prevent boiling on the fuel plate surfaces.

At startup and during shutdowns (with safety rod fully withdrawn), equilibrium water temperature is about 275° F. to compensate for the reactivity increase introduced by xenon decay. Equilibrium water pressure is 45 p.s.i.a. at 275° F.

The secondary water coolant enters the intermediate heat exchanger at 160° F. and leaves at 180° F. The pressure drop in the intermediate heat exchanger is approximately 5 lbs./n.$^2$ at 34 g.p.m. Four ¾ inch O.D. tubes provide parallel flow paths for the secondary coolant. Flow velocity in the tubes is 8 ft./sec. If desired, it is possible to design the secondary coolant system to also operate by natural convection. This would allow the heating plant to operate completely independent of any other power source. In this case, the intermediate heat exchanger would necessarily be more bulky; large diameter tubes would be used to lower the pressure drop.

The reactor design characteristics of this specific example are summarized in Table I:

TABLE I.—REACTOR DESIGN CHARACTERISTICS—SUMMARY

Power (Thermal):
  Kw ______________________________ 100.
  B.t.u./hr. _______________________ 340,000.
Reactor Pressure Vessel:
  Material _________________________ Aluminum
  Height, feet _____________________ 10.
  Diameter, inches _________________ 20.
  Weight (dry), lbs. _______________ 500.
  Weight (wet), lbs. _______________ 1800.
Reactor Core:
  Height, inches ___________________ 18.
  Diameter, inches _________________ 12.
  Average Thermal Core Flux, n./cm.$^2$ sec.  $1.9 \times 10^{12}$.
Fuel Elements:
  Type ____________________________ Aluminum clad, uranium-aluminum alloy plates.
  Number __________________________ 69.
Fuel Loading, gms. U–235 ____________ 1550.
Fuel Burnup (3 years, 100 kw.), gms. U–235 ____________________ 120.
Primary Coolant:
  Material _________________________ Water.
  Core inlet temperature, ° F. _____ 180.
  Core exit temperature, ° F _______ 200.
  Flow rate. g.p.m. ________________ 34.
  Operating pressure, p.s.i.g. _____ 10.
  System design pressure, p.s.i.a. _ 150.
Secondary (External) Coolant:
  Material _________________________ Water.
  Inlet temp., ° F. _______________ 160.
  Exit temp., ° F. ________________ 180.
  Flow rate, g.p.m. _______________ 34.
  Operating pressure ______________ Atmospheric.

The estimated cold clean fuel loading is 1200 gms. of $U^{235}$. Operational requirements, as listed below, raise the total fuel loading to 1650 gms. of $U^{235}$:

|  | Gms. $U^{235}$ | Δk, percent |
|---|---|---|
| Burnup (100 kw., 3 years) | 120 | 1.8 |
| Fission Products (other than Xe and Sm) | 30 | .5 |
| Samarium | 70 | 1.0 |
| Equilibrium Xenon | 60 | .9 |
| Temperature (68° F.→190° F.) | 70 | 1.0 |
|  | 350 | 5.2 |
| Excess Burnable Poison | 100 |  |
|  | 450 |  |

In this design, burnable poison will be used to compensate for fuel burnup and fission products (ther than Sm and Xe) and that an equilibrium concentration of Sm can be added to the initial core loading. Operational reactivity compensation will then be required by xenon and temperature. At 100 kw. operation, the average core thermal neutron flux is $1.9 \times 10^{12}$ neuts/cm.$^2$ sec. and the corresponding equilibrium xenon is equivalent to about 0.9% in reactivity. The temperature coefficient of reactivity at room temperature is estimated to be $-0.3 \times 10^{-4}/°$ F. At 200° F., a temperature coefficient of $-1 \times 10^{-4}/°$ F. is predicted and at 300° F., $$-1.4 \times 10^{-4}/° F.$$

Shield design was based on the requirement that the dose rate at ground level above the reactor be less than 0.5 mrem./hr. at 100 kw. operation. This requirement dictates that the shield be about 20 ft. of water or equivalent. Concrete, steel, earth or other shielding materials can be used to decrease the shield thickness requirement.

The design chosen here uses ~7 ft. of water and 2 ft. of ordinary steel directly above the reactor core. The minimal burial depth of the core is about 10 ft. if the assumption is made that earth (average density of 2.0 g./cm.$^3$) is to be used as side shielding material. If a superior shield material such as steel, lead or concrete is used as side shielding, the depth can be decreased. After shutdown, radiation is of importance for refueling or maintenance problems. Removal of the pressure vessel top head allows access to the reactor core through 7 ft. of water. The dose rate at the water surface one day after shutdown after 1000 hrs. operation at 100 kw. is about 180 mr./hr. Earth activation around the reactor may be suppressed by filling the space between the pressure vessel and the iron pipe well with borax.

According to this invention, heat is transferred from the fuel plates to the circulating cooling water by natural convection. The flow rate of water is determined almost solely by throttling in the intermediate heat exchanger since insignificant pressure drop occurs in the reactor core and the remainder of the flow circuit. It is important to note for a given coolant temperature gradient (chosen as 20° F. here), a thermal convection driving head exists which may be used to improve heat transfer coefficients either in the core or the intermediate heat exchanger. The heat transfer coefficient in the core is calculated to be 200 B.t.u./hr. ft.$^2$ ° F. This yields an average fuel plate film temperature drop of 34° F. and a maximum fuel plate surface temperature estimated as 240° F. Equilibrium water pressure at 240° F. is 25 p.s.i.a., hence the local pressure at the fuel plates must exceed this value if boiling is to be suppressed.

Heat transfer in the intermediate heat exchanger is limited by the heat transfer coefficient on the shell (primary coolant) side. A heat transfer coefficient of 700 B.t.u./hr. ft.$^2$ ° F. has been calculated for the shell side and an over-all heat transfer coefficient of 500 B.t.u./hr. ft.$^2$ ° F. was used in determining the heat transfer area required.

Heat transfer from the hot water (200° F.) inside the core shroud to the cold water (180° F.) on the outside has been calculated to be negible if a 1/8 in. air gap is used in the shroud.

In a cold clean condition, the reactor has an excess reactivity of 1.9% which is held down by the safety rod. To start up, the safety rod is slowly withdrawn and the reactor allowed to rise in temperature. Equilibrium temperature for the reactor with the safety rod out and no xenon is 275° F. About 80 kw.-hrs. of heat are required to raise the system temperature from 68° F. to 275° F. If an average power of ~100 kw. is maintained while withdrawing the safety rod, it will take somewhat less than an hour to bring the system to 275° F. With no coolant flowing in the secondary circuit, the reactor power level will then be determined by natural convection and conduction heat losses. To withdraw heat, the secondary water coolant is circulated through the intermediate heat exchanger. At equilibrium, with 34 g.p.m. of secondary coolant entering at 160° F. and leaving at 180° F., the reactor will operate at 100 kw. at a mean reactor temperature of 190° F. There are other equilibrium power levels possible in the reactor at other temperature levels. In general, if the reactor is allowed to operate below 190° F., a larger power output is required for equilibrium and at higher temperatures, a lower power is required for equilibrium. At room temperature, for example, the reactor will operate at 300 kw. in equilibrium with xenon (assuming the heat is being removed by the secondary coolant).

Figures 13, 14:
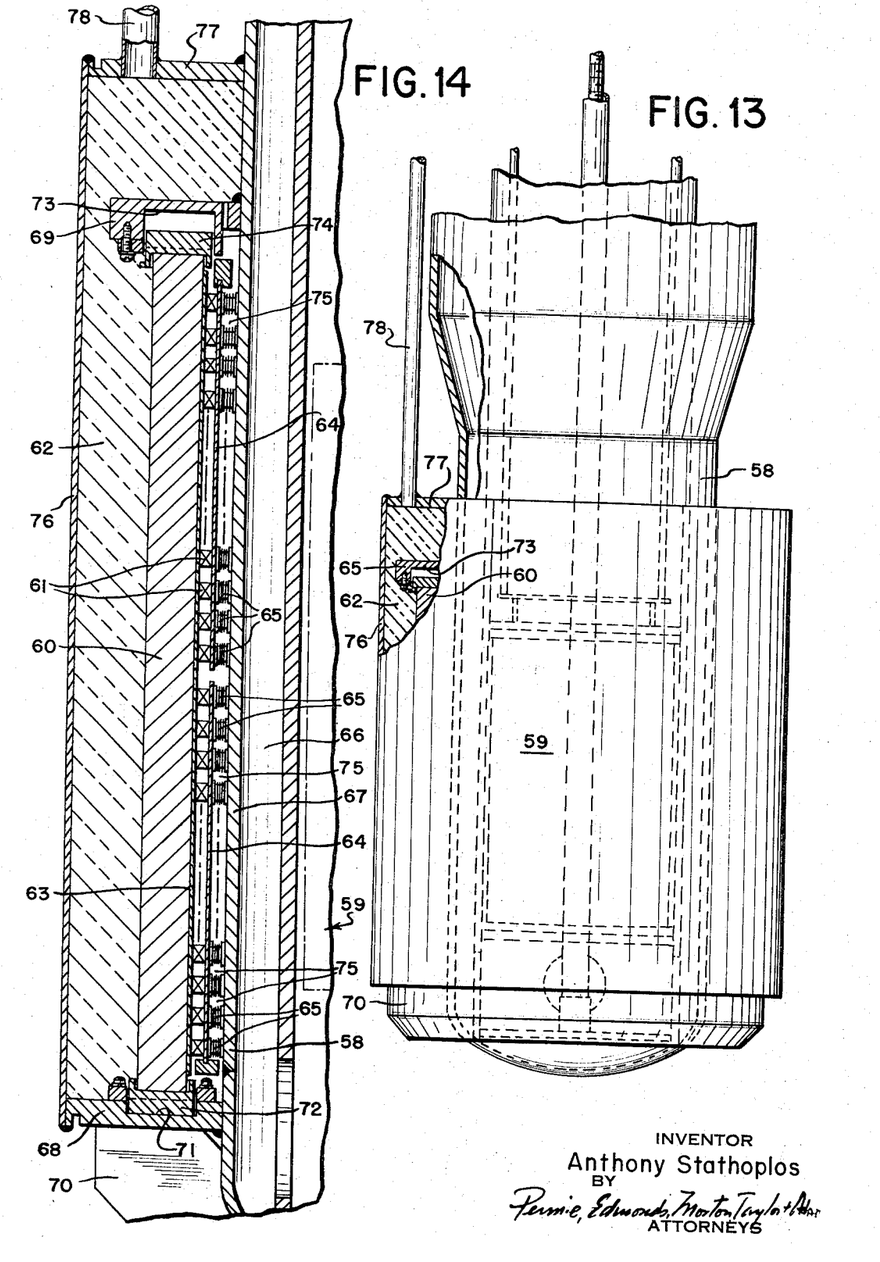
FIG. 13 is a side elevation of a second embodiment of this invention partially broken away to show a fissionable blanket surrounding the pressure vessel of the reactor.
FIG. 14 is a side view showing a detail arrangement of the thermal electrical elements located in the blanket assembly for recovery of electrical energy generated in the blanket.

To improve the neutron economics, a blanket of fissionable material can be added to the periphery of the reactor vessel to capture the leakage neutrons for fissions in the blanket. The heat generated by fission in the blanket can be recovered in the form of electrical power. This embodiment of the present invention is illustrated in FIGS. 13 and 14 of the accompanying drawings. The nuclear reactor used in this embodiment is similar to the one shown in FIG. 1 with the exception that the pressure vessel is modified to accommodate a blanket of depleted uranium. FIG. 13 shows the lower portion of the reactor. The pressure vessel 58 is necked-down above the critical reactor core 59. The reduced diameter of the pressure vessel 58 enables a blanket of depleted uranium 60 to be closer to the critical core. In this embodiment, the heat generated in the blanket 60 is recovered in the form of electrical power using thermoelectric elements 61. The blanket consists of an annular cylinder of depleted uranium 1½ in. thick and 24 in. high, slightly above the height of the critical core which is 18 in. tall. Of course, it is understood that the depleted uranium still contains fusionable material. The annulus is divided around its circumference into 60 segments or bars each 24 in. long. Total weight of the blanket is approximately 1500 pounds. Each uranium bar is preferably plated with a few mils of nickel and electrically insulated from each other by a thin sheet of insulating material. The outside of the blanket is thermally insulated by insulators 62.

The thermoelectric generators 61 occupy the region between the blanket 60, which is the heat source, and the vessel 58, which is the heat sink. It consists of 60 identical units, or cells, corresponding to the 60 segments of the blanket and the units are electrically connected in series. Each unit consists of 12 cubes of n-type and 12 cubes of p-type PbTe ½ in. high and approximately ½ by ½ in. in cross section. Each cube requires end connectors to provide a thermal path between the heat source and sink and also to provide terminals for electrical connections. The cubes of PbTe are bonded to a low carbon steel strip 63 by induction heating. The PbTe cubes are spaced along the length of the strip in a chopped cosine distribution to compensate for the non-uniform heat generation along its length of the element during operation. This unequal spacing of the heat flow paths from the blanket fuel element to the heat sink will tend to maintain a uniform hot junction temperature. The strip is divided symmetrically about its midplane, one half of the strip containing the 12 p-type and the other half the 12 n-type lead telluride cubes.

The cold junctions of all 12 cubes on one half of the steel strip are soldered to a common aluminum bar 64 which gives rigidity to the unit. The outer ends of these bars also provide a terminal for the electrical interconnection of the cells (not shown). Small stainless steel bellows 65 complete the thermal path from the aluminum bar to the vessel wall. These bellows 65 are sealed and contain a charge of a low melting alloy such as Wood's metal which will provide the required heat transfer area. The bellows can flex 1/8 in. and provide the spring force to ensure good thermal contact. The Wood's metal charge does not completely fill the bellows to allow for flexure and will remain molten at the operating temperature. The bellows end fitting that contacts the vessel wall has a thin coating of aluminum oxide flame sprayed thereon to provide electrical insulation for the thermo-electric element's cold junction, and simultaneously to allow the heat to flow through to the reactor coolant passing through space 66 between the shroud 67 and the pressure vessel 58. The Al$_2$O$_3$ coated shoe that contacts the vessel wall has a cross sectional area greater than that of the bellows to provide the maximum heat transfer area possible.

Adjacent generator cells are placed in position inverted relative to one another so that the half of one cell with p-type elements is adjacent to the half of the neighboring cell with n-type elements. This arrangement facilitates the series interconnection between the cells.

The entire thermoelectric generator assembly including the blanket 60, insulation 62 and the generator 61 is supported from the lower portion of the reactor vessel by two aluminum flanges 68 and 69 welded to the vessel.

The lower flange 68 which carries most of the weight of the assembly has aluminum gusset plates 70 welded both to the flange and vessel. The blanke barst 60 rest in a track 71 running around the lower flange. This track is lined with Min-K blocks 72, a thermal insulating material marketed by Johns Manville Aerospace Products, recessed to hold the ends of the uranium bars which provide both thermal and electrical insulation and hold the bars in proper position. The upper flange 69 also has a track 73 which holds the Min-K 74 similarly recessed to hold the ends of the uranium bars. These blocks are free to move in the vertical direction to allow for the 0.24 inch thermal expansion growth in going from room to operating temperature.

The exterior insulation 62 of the blanket is also Min-K about 2 in. thick and the space 75 between the inside surface of the blanket and the vessel wall, not occupied by thermoelectric material and their connectors, is filled with powdered insulation such as powdered Min-K or diatomaceous earth.

The entire unit is covered by a thin aluminum sheet 76 welded to outer edges of the bottom flanges 68 and an upper flange 77, respectively, forming a vapor tight can around the entire generator. The can contains argon at atmospheric pressure with about 5% hydrogen added to maintain a reducing condition. The inert atmosphere reduces the volatilization of the lead telluride at the hot junction and prevents oxidation at the contacts. The top flange has two ½ in. O.D. aluminum tubes 78 welded on it through which the electrical leads from the generator emerge. These tubes are also used for purging and filling the generator with its inert atmosphere.

The reduction of the pressure vessel 58 is from 20 in. O.D. to 16 in. This arrangement reduces the water reflector thickness in the vicinity of the core from 4 in. in the embodiment shown in FIG. 1 to 2 in. in this embodiment.

Aside from fissions in the blanket, the gamma and neutron heating from core fissions contributes to the blanket power also. It is estimated that perhaps 3% to 4% of the core power output is deposited in the blanket as gamma and neutron heating.

I claim:

1. A water-cooled and moderated non-boiling low pressure nuclear reactor suitable for installing at an underground pit for space heating purposes, and being self-regulating at equilibrium power level, said reactor comprising:

(a) a pressure vessel adapted for underground installation,
   (b) a critical reactor core assembly having coolant channels therein and being mounted geometrically at the lower portion of said vessel,
   (c) a shroud surrounding said core assembly extending from the bottom of the pressure vessel to substantially above the reactor core assembly to provide an inner zone and an outer zone within said vessel, said zones communicating with each other by the openings at the upper and the lower portions of said shroud,
   (d) heat exchanging means for removing sufficient heat generated by the reactor core during the operation of the reactor to maintain the reactor in its equilibrium power level during the operational period, said means being positioned at said outer zone below the openings of the shroud and above the reactor core assembly,
   (e) a body of water substantially filling the inner and the outer zones and being circulated in these zones through the openings of the shroud during the operation of said reactor by natural convection created by the thermal energy from said core assembly, said body of water flowing upwardly through the coolant channels of the reactor core assembly to remove the heat generated therein and downwardly through said heat exchanging means to release said heat, and
   (f) a safety rod located fully in said core assembly during the shutdown period and fully out during the operation of the reactor,
   (g) a fissionable blanket around the periphery of the lower portion of the pressure vessel to capture neutrons escaped from said vessel, and
   (h) thermal electric elements disposed between said blanket and said pressure vessel using the blanket as hot junctions and the pressure vessel convections as cold junctions to generate electrical power therein.

2. A water-cooled and moderated non-boiling low pressure nuclear reactor suitable for installing at an underground pit for space heating purposes, and being self-regulating at equilibrium power level, said reactor comprising:

(a) a cylindrical pressure vessel adapted for underground installation,
   (b) a critical reactor core assembly having coolant channels therein and concentrically mounted at the lower portion of said vessel,
   (c) a shroud surrounding said core assembly extending from the bottom of the pressure vessel to substantially above the reactor core assembly to provide an inner zone and and outer zone within said vessel, said zones communicating with each other by the openings at the upper and the lower portions of said shroud,
   (d) heat exchanging means for removing sufficient heat generated by the reactor core during the operation of the reactor to maintain the reactor in its equilibrium power level during the operational period, said means being positioned at said outer zone below the openings of the shroud and above the reactor core assembly,
   (e) a body of water substantially filling the inner and the outer zones and being circulated in these zones through the openings of the shroud during the operation of said reactor by natural convection created by the thermal energy from said core assembly, said body of water flowing upwardly through the coolant channels of the reactor core assembly to remove the heat generated therein and downwardly through said heat exchanging means to release said heat,
   (f) a safety rod located fully in said core assembly during the shutdown period and fullly out during the operation of the reactor,
   (g) a slab of fissionable blanket around the periphery of the lower portion of the pressure vessel having a height substantially equivalent to that of the reactor core assembly to capture neutrons escaped from said vessel for heat generation therein, and
   (h) thermal electric elements positioned between said blanket and said pressure vessel using the blanket as hot junctions and the pressure vessel connections as cold junctions for electrical power generation.

3. A water-cooled and moderated non-boiling low pressure nuclear reactor suitable for installing at an underground pit for space heating purposes, and being self-regulating at equilibrium power level, said reactor comprising:

(a) a cylindrical pressure vessel adapted for underground installation, said vessel having a reduced diameter at its lower portion,
   (b) a critical reactor core assembly having coolant channels therein and concentrically mounted at the reduced diameter lower portion of said vessel,
   (c) a shroud surrounding said core assembly extending from the bottom of the pressure vessel to substantially above the reactor core assembly to provide an inner zone and an outer zone within said vessel, said zones communicating with each other by the openings at the upper and the lower portions of said shroud,
   (d) heat exchanging means for removing sufficient heat generated by the reactor core during the operation of the reactor to maintain the reactor in its equilibrium power level during the operational period, said means being positioned at said outer zone below the openings of the shroud and above the reactor core assembly, (e) a body of water substantially filling the inner and the outer zones and being circulated in these zones through the openings of the shroud during the operation of said reactor by natural convection created by the thermal energy from said core assembly, said body of water flowing upwardly through the coolant channels of the reactor core assembly to remove the heat generated therein and downwardly through said heat exchanging means to release said heat, (f) a safety rod located fully in said core assembly during the shutdown period and fully out during the operation of the reactor, (g) a slab of fissionable materials closely positioned around the periphery of the small cross-sectional lower portion of said vessel to capture neutrons escaped from said vessel, (h) thermal electrical elements placed between the slab of fissionable material and said vessel using said fissionable materials as hot junctions and the connections to the pressure vessel as cold junctions, and (i) means to remove the electrical power generated in said thermal elements.

4. A water-cooled and moderated non-boiling low pressure nuclear reactor of claim 3 wherein said slab of fissionable materials is depleted uranium blanket.

References Cited

UNITED STATES PATENTS

| | | | |
|---|---|---|---|
| 2,982,710 | 5/1961 | Leyse et al. | 176—62 X |
| 2,992,982 | 7/1961 | Avery | 176—17 |
| 3,118,818 | 1/1964 | Bray | 176—62 |
| 3,150,051 | 9/1964 | Ammon | 176—53 |
| 3,245,879 | 4/1966 | Purdy et al. | 176—36 |

REUBEN EPSTEIN, *Primary Examiner.*